INVENTOR
JACK RALLO
FRANK J. ZAVATTO
BY
ATTORNEY

United States Patent Office 3,114,098
Patented Dec. 10, 1963

3,114,098
SELF-REGULATING DIRECT CURRENT
POWER SUPPLY
Jack Rallo, Brooklyn, and Frank J. Zavatto, Oceanside, N.Y., assignors to Sperry Rand Corporation, Great Neck, N.Y., a corporation of Delaware
Filed Sept. 28, 1960, Ser. No. 58,999
8 Claims. (Cl. 321—18)

The present invention generally relates to self-regulating power supplies and, more particularly, to a self-regulating power supply for the prdouction of a constant value of direct current from a three phase primary power source.

It is the principal object of the present invention to provide a self-regulating direct current power supply characterized by high efficiency and small size and weight.

Another object is to provide a solid state power supply for the production of an essentially constant direct current from a three phase primary power source.

A further object is to provide a self-regulating direct current power supply utilizing semiconductor devices as load current controlling elements for the production of an essentially constant load current from a three phase primary power source.

These and other objects of the present invention, as will appear from a reading of the following specification, are accomplished in a preferred embodiment by the provision of gated rectifiers of a semiconductor type for the rectification of each respective phase of a three phase primary power source. Each of the three gated rectifiers conducts during each alternation period of the primary power source for an interval initiated by the occurrence of a gating pulse and terminated when the amplitude of the respectively applied phase of the primary power source falls below a certain level. The gating pulses for each of the gated rectifiers are produced by a respective synchronized relaxation oscillator. The three relaxation oscillators are connected in cascade and produce trains of gating pulses separated from each other by 120° of the primary power source alternation period.

The phase of the pulses produced by a primary one of the three relaxation oscillators relative to its associated primary power phase is controlled in accordance with the amount of current flowing through the power supply load. Thus, the phases of the pulses produced by all three relaxation oscillators relative to the primary power source alternation period vary together in equal amounts as a function of load current change. The timing of the pulses determines the firing angles of the gated rectifiers so as to minimize any variation in the load current from a prescribed desired value. Each of the three relaxation oscillator circuits is substantially identical and utilizes highly efficient, light and small semiconductor devices.

For a more complete understanding of the present invention, reference should be had to the following specification and to the appended drawings of which:

Figure 1:
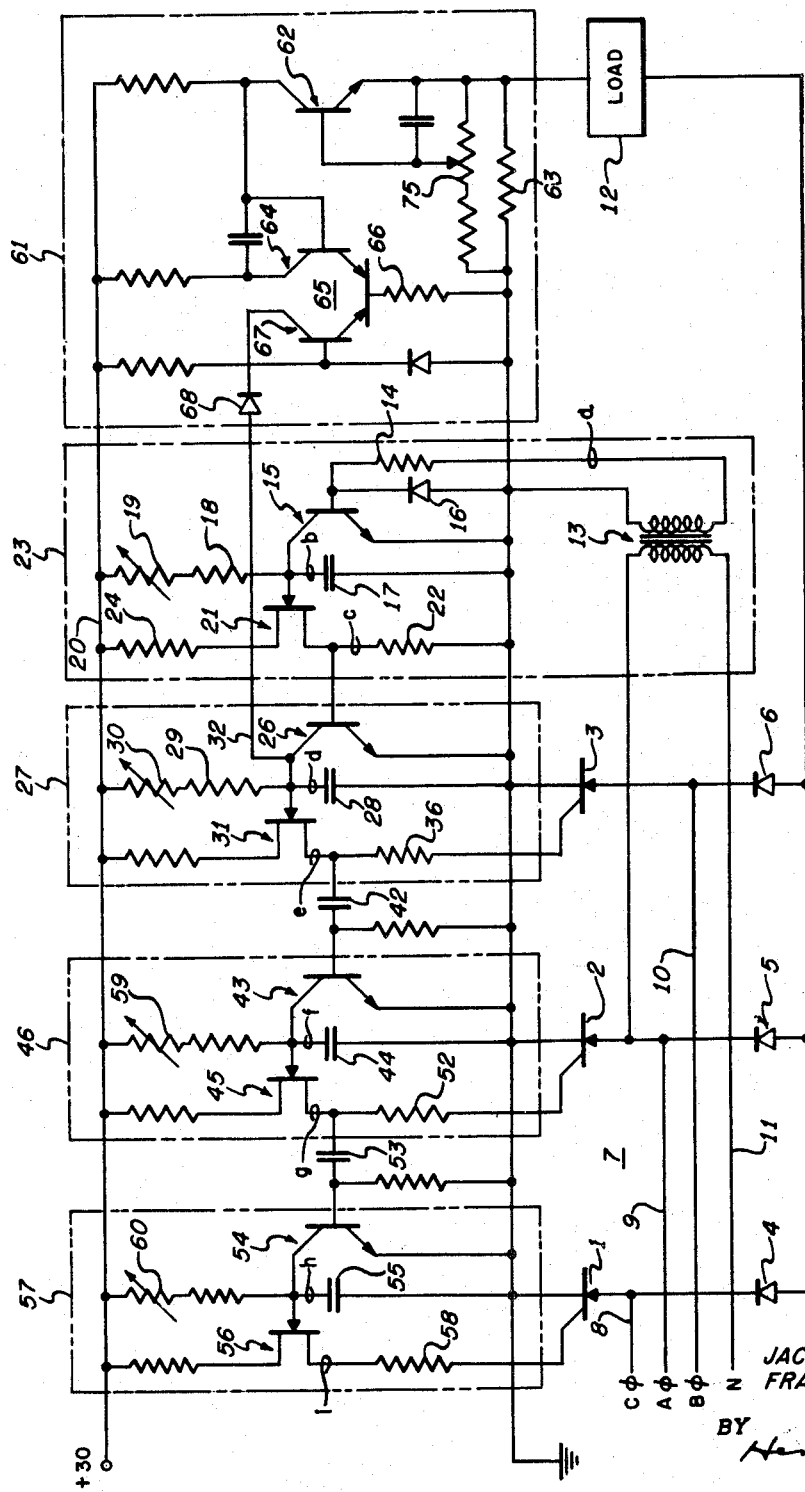
FIG. 1 is a schematic diagram of a preferred embodiment.

Referring to FIG. 1, gated solid state rectifiers 1, 2 and 3 and conventional two element semiconductor rectifiers 4, 5 and 6 comprise the forward legs and back legs, respectively, of a conventional three phase bridge rectifier circuit 7. Three phase alternating current from a primary power source (not shown) is applied to rectifier circuit 7 via lines 8, 9, 10 and 11. As will be seen more fully later, the firing angles of gated rectifiers 1, 2 and 3 are varied in unison for the supply of an essentially constant direct current to load 12.

In order to synchronize the firings of gated rectifiers 1, 2 and 3, a synchronizing signal is derived between lines 9 and 11 (phase A and neutral, respectively, of the primary power source) and applied to the primary of transformer 13. The alternating signal developed across the secondary of transformer 13 is applied via resistor 14 to the base of grounded emitter transistor 15. Diode 16 prevents the base of transistor 15 from becoming negative with respect to ground. The resultant positive half cycles of the synchronizing signal from transformer 13 gate transistor 15 into conduction. Transistor 15 is nonconductive during the half cycles intervening said positive half cycles. During the time that transistor 15 is nonconductive capacitor 17, connected between the collector and ground, is permitted to charge through resistors 18 and 19 toward the positive potential of line 20 to produce a positive-going sawtooth waveform across capacitor 17.

The sawtooth waveform is applied between the emitter and lower base terminals of unijunction transistor 21. The upper base terminal of transistor 21 is connected to line 20 via resistor 24. When the emitter potential of unijunction transistor 21 is less than a predetermined value with respect to the lower base terminal, only a small reverse leakage current will flow between the emitter and lower base terminal. When the sawtooth potential developed across capacitor 17 reaches said predetermined value, unijunction transistor 21 will turn on presenting a very low impedance between the emitter and lower base terminal. Capacitor 17 will then be discharged through resistor 22 connected between the lower base terminal of unijunction transistor 21 and ground. Transistor 15, capacitor 17 and unijunction transistor 21 are the essential elements of a synchronized or gated relaxation oscillator 23. A typical gated relaxation oscillator of this type is shown in FIG. 4.12 (B) of the General Electric Controlled Rectifier Manual, first edition, 1960, page 55.

Figure 2:
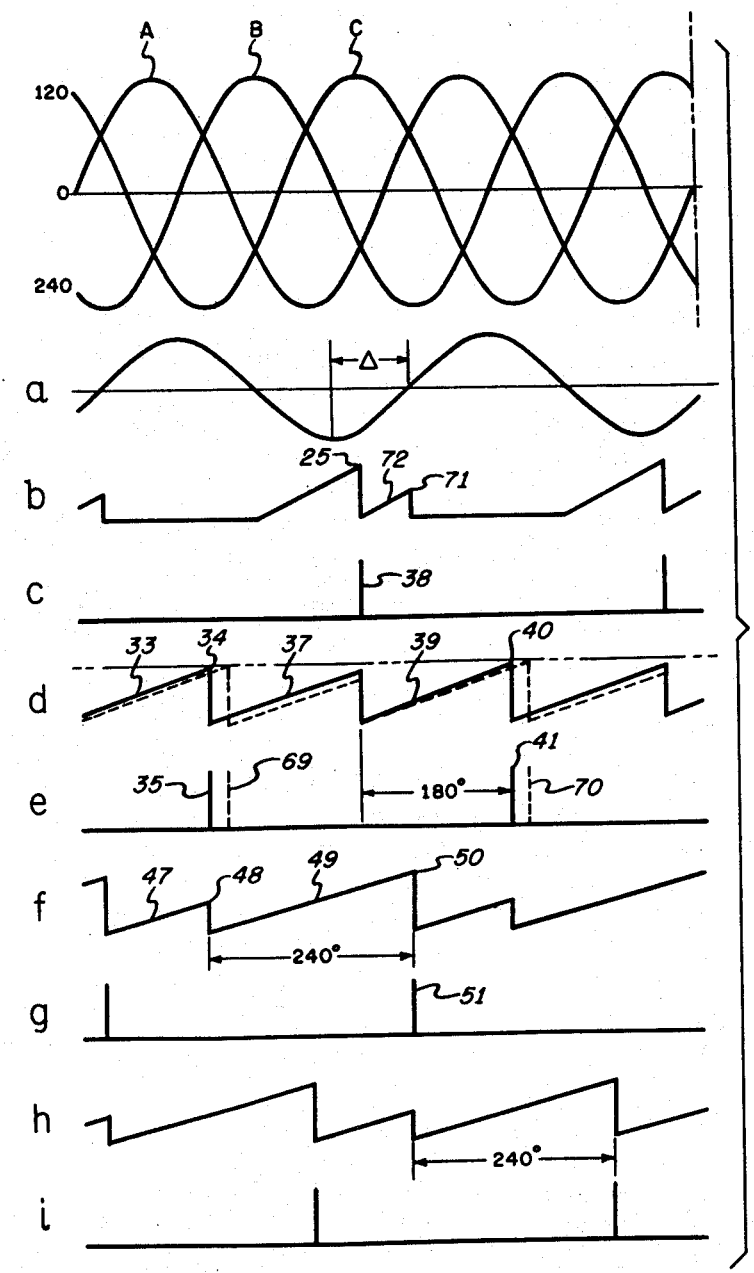
FIG. 2 is a series of waveforms useful in explaining the operation of the embodiment of FIG. 1.

A better understanding of the operation of gated relaxation oscillator 23 may be had by reference to the waveforms of FIG. 2. The three phase primary power source signals applied via lines 9, 10 and 8 are represented, respectively, by waveforms A, B and C. As previously mentioned, the A phase signal is applied to the primary of transformer 13. Waveform $a$ is developed across the secondary of transformer 13 after a small phase delay attributable to the transformer inductance. During the positive half cycles of waveform $a$, transistor 15 is rendered conductive discharging capacitor 17. During the negative half cycles of waveform $a$, transistor 15 is cut off permitting capacitor 17 to charge toward the emitter firing potential of unijunction transistor 21.

Waveform $b$ represents the signal developed across capacitor 17 which reaches said firing potential at point 25. Upon the firing of unijunction transistor 21, the potential across capacitor 17 is rapidly returned toward ground terminating the conduction of unijunction transistor 21 and permitting the recharging of capacitor 17 along waveform portion 72. The second charging cycle 72 of capacitor 17 is prematurely terminated at point 71 by the initiation of the succeeding positive half cycle of waveform $a$ which turns on transistor 15 to discharge capacitor 17. The repetitive series of pulse represented by waveform $c$ is developed across resistor 22 upon the firings of unijunction transistor 21. The time at which the rising potential across capacitor 17 reaches the firing value of unijunction transistor 21 and hence the time of occurrence of the pulses of waveform $c$, may be varied by the setting of variable resistor 19.

The pulses of waveform $c$ are applied to the base of transistor 26 at the input of gated variable frequency relaxation oscillator 27. Oscillator 27 is substantially identical to oscillator 23 in operation excepting that the free-running period of the relaxation oscillator comprising capacitor 28, resistors 29 and 30 and unijunction transistor 31 is varied in accordance with the magnitude of a control current applied to capacitor 28 via line 32. This is in contrast to the constant frequency or fixed free-running period of the relaxation oscillator comprising capacitor 17, resistors 18 and 19 and unijunction transistor 21. As will be seen more fully later, the amplitude of the control current is determined in accordance with the amount of current flowing through load 12. For a given value of load current and for a corresponding predetermined value of control current, the positive-going sawtooth signal produced across capacitor 28 during the nonconduction of transistor 26 reaches the firing point of unijunction transistor 31 after a fixed interval. A variation in the control signal of line 32 produces a corresponding variation in said interval.

Solid line waveform $d$ of FIG. 2 represents a typical series of sawtooth signals developed across capacitor 28. Sawtooth portion 33 is produced during the time that transistor 26 is cut off permitting the charge across capacitor 28 to reach the firing potential of unijunction transistor 31. Said potential is reached at point 34 to produce the pulse 35 of waveform $e$ at resistor 36 of FIG. 1. Following the discharge of capacitor 28, new sawtooth waveform portion 37 is initiated. The second sawtooth portion 37, however, is prevented from reaching the firing potential of unijunction transistor 31 by the occurrence of pulse 38 of waveform $c$ which turns on transistor 26 to discharge capacitor 28. Following the last-named discharging of capacitor 28, the third sawtooth portion 39 is initiated this time reaching the firing potential of unijunction transistor 31 at point 40 to produce the second pulse 41 of waveform $e$ at resistor 36. Variable resistor 30 of gated relaxation oscillator 27 is adjusted so that pulse 41 of waveform $e$ follows the occurrence of pulse 38 of waveform $c$ by a phase angle having the nominal value of 180° of the repetition interval of the three phase primary power source signals. It will be seen that said phase angle is subject to alternation as a function of the current flowing through load 12 of FIG. 1.

The pulses of waveform $e$ are jointly applied to the gating electrode of gated rectifier 3 and, via capacitor 42 to the base of transistor 43. Transistor 43, capacitor 44 and unijunction transistor 45 comprise the basic elements of gated constant frequency relaxation oscillator 46. In a manner similar to that described in connection with oscillators 23 and 27, capacitor 44 charges toward the potential of line 20 during those intervals when transistor 43 is nonconductive. Sawtooth portion 47 of waveform $f$ of FIG. 2 is produced during such an interval. Sawtooth portion 47 is terminated at point 48 upon the occurrence of pulse 35 of waveform $e$ which turns on transistor 43 to discharge capacitor 44. Following the discharge of capacitor 44, sawtooth portion 49 is initiated and continues to rise uninterruptedly until the firing potential of unijunction transistor 45 is reached at point 50. The abrupt discharging of capacitor 44 at point 50 produces the output pulse 51 of waveform $g$ at resistor 52. Pulse 51 is jointly applied to the gating electrode of gated rectifier 2 and via capacitor 53 to the base of transistor 54. Transistor 54, capacitor 55 and unijunction transistor 56 together comprise the basic elements of gated constant frequency relaxation oscillator 57 which is similar in structure and operation to oscillators 46 and 23.

In a fashion similar to that described in connection with oscillators 46, 27 and 23, a sawtooth waveform is developed across capacitor 55 and is terminated upon the conduction of either transistor 54 or unijunction transistor 56. As shown in waveform $h$ of FIG. 2, the terminations of the sawtooth portions of waveform $h$ due to the conduction of unijunction transistor 56 produce the pulses of waveform $i$ at resistor 58. Said pulses are applied to the gating electrode of gated rectifier 1. By proper adjustment of resistors 59 and 60 of oscillators 46 and 57, respectively, the pulse trains of waveforms $e$, $g$ and $i$ are made to occur 120° phase displaced with respect to each other. Consequently, gated rectifiers 1, 2 and 3 are gated for conduction in sequence 120° apart from each other with respect to the alternation interval of the three phase primary power source.

It will be noted by reference to FIG. 2 that pulses 35 and 41 of waveform $e$ are adjusted by means of resistors 19 and 30 to occur at a time when the amplitude of the phase B waveform starts to exceed the amplitudes of both of the phase A and phase C waveforms of the primary power source. In this case, each of the gated rectifiers 1, 2 and 3 would conduct for a respective full 120° of the primary power source alternation interval. Maximum current would flow through a given load 12.

It is desired to maintain a predetermined amount of current flowing through the load 12 irrespective of circuit changes which would tend to vary the load current. For this purpose, load current sensing circuit 61 is introduced in series with the load current to be monitored. When no load current flows, transistor 62 is held cut off by a zero base-to-emitter potential developed across resistor 63. Transistor 64 of differential amplifier 65 is turned full on by the collector potential of transistor 62 when the latter is nonconductive. The base-to-emitter bias developed across resistor 66 by heavily conducting transistor 64 cuts off transistor 67 whereby no compensating current signals flow via diode 68 to capacitor 28 of gated relaxation oscillator 27.

In the presence of a finite load current, a potential drop appears across resistor 63. A selectable portion of said potential, determined by the setting of resistor 75, is applied between the base and emitter electrodes of transistor 62 with such a polarity as to bias transistor 62 toward conduction. When the load current increases beyond a desired value, transistor 62 conducts more heavily causing reduced conduction in transistor 64, in turn biasing transistor 67 on. It will be seen that the amount of collector current flowing in transistor 67 is a direct function of the deviation of the load current from a predetermined desired value established by adjustment of resistor 75.

For increases of load current beyond said desired value, the collector current of transistor 67 increases adding a charging current component to capacitor 28 in such a direction as to delay the charging rate of capacitor 28. This condition is shown by the dotted waveform of FIG. 2d. It will be noted that pulses 35 and 41 of waveform $e$ would be effectively phase shifted to the positions of pulses 69 and 70 as a result of the generation of the dotted sawtooth waveform of FIG. 2d across capacitor 28. The phase shifted pulses 69 and 70 would increase the firing angle of gated rectifier 3 whereby rectifier 3 would conduct for an angle less than 120° of the alternation interval of the primary power source. Inasmuch as gated rectifiers 2 and 1 are successively gated at 240° delayed intervals following the gating of rectifier 3, the firing angles of all three rectifiers 3, 2 and 1 would be increased in unison decreasing the amount of rectified current flowing through load 12. The decrease of load current resulting from the increased firing angle of rectifiers 1, 2, and 3 reduces toward zero the variation in load current from the desired value which first caused the rectifier firing angle to change. An analogous situation obtains in the case where the amount of load current would tend to decrease from the desired value to be maintained. Such a decrease in load current would reduce the control current flow through diode 68 to increase the slope of the sawtooth portions of waveform $d$ whereby the firing angles of the gated rectifiers 1, 2 and 3 would be reduced by substantially identical amounts. The reduced firing angle which increases the angle of conduction of the gated rectifiers restores the actual load current to the desired value.

It will be seen from the preceding specification that the objects of the present invention have been achieved in a preferred embodiment by the use of gated relaxation oscillators utilizing solid state devices for controlling the firing angles of gated rectifiers of a semiconductor type in a sense and by an amount so as to maintain the monitored load current at a desired value. By virtue of the utilization of solid state control elements, a self-regulating direct current power supply is produced having the advantageous attributes of high efficiency, small size and low weight.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a power supply having first, second and third gated rectifiers for the rectification of respective phases of a three phase primary power source, each of said rectifiers conducting during each alternation period of said source for an interval determined by the occurrence of a respective one of gating pulses, means for producing said gating pulses comprising first, second and third pulse generators connected in cascade, said first generator producing a single output pulse at a variable time subsequent to the occurrence of each input pulse applied thereto, each of said second and third generators producing a single output pulse at a fixed time subsequent to the occurrence of each input pulse respectively applied thereto, means coupled to one phase of said source for producing a pulse signal synchronous therewith, said signal being applied to said first generator, the output pulse produced by said first, second and third generators being applied as said gating pulses to respective ones of said rectifiers, and means coupled to said first generator for varying the time of occurrence of the output pulse produced thereby.

2. In a power supply having first, second and third gated rectifiers for the rectification of respective phases of a three phase primary power source, each of said rectifiers conducting during each alternation period of said source for an interval determined by the occurrence of a respective one of gating pulses, means for producing said gating pulses comprising first, second, third and fourth pulse generators connected in cascade, each of said first, third and fourth generators producing a single output pulse at a fixed time subsequent to the occurrence of each input pulse respectively applied thereto, said second generator producing a single output pulse at a variable time subsequent to the occurrence of each input pulse applied thereto, means coupled to one phase of said source for producing a pulse signal synchronous therewith, said signal being applied to said first generator, the output pulse of said second, third and fourth generators being applied as said gating pulses to respective ones of said rectifiers, and means coupled to said second generator for varying the time of occurrence of the output pulse produced thereby.

3. In a power supply having first, second and third gated rectifiers for the rectification of respective phases of a three phase primary power source, each of said rectifiers conducting during each alternation period of said source for an interval determined by the occurrence of a respective one of gating pulses, apparatus comprising means for producing said gating pulses including first, second and third gated relaxation oscillators connected in cascade, said first oscillator having a variable free-running frequency and producing a single output pulse at a variable time subsequent to the occurrence of each input pulse applied thereto, each of said second and third oscillators having a constant free-running frequency and producing a single output pulse at a fixed time subsequent to the occurrence of each input pulse respectively applied thereto, means coupled to one phase of said source for producing a pulse signal synchronous therewith, said signal being applied to said first oscillator, the output pulse of said first, second and third oscillators being applied as said gating pulses to respective ones of said rectifiers, and means for varying the free-running frequency of said first oscillator to vary the time of occurrence of the output pulse produced thereby.

4. Apparatus as defined in claim 3 wherein each of said gated relaxation oscillators comprises a capacitor, means for charging said capacitor, a first transistor for discharging said capacitor, and a unijunction transistor for discharging said capacitor; said capacitor being discharged by said first transistor when rendered conductive by the input pulse applied thereto and being discharged by said unijunction transistor when the charge on said capacitor reaches a predetermined level.

5. In a self-regulating power supply having first, second and third gated rectifiers for the rectification of respective phases of a three phase primary power source to produce a rectified load current, each of said rectifiers conducting during each alternation period of said source for an interval determined by the occurrence of a respective one of gating pulses, means for producing said gating pulses comprising first, second and third pulse generators connected in cascade, said first generator producing a single output pulse at a variable time subsequent to the occurrence of each input pulse in accordance with the value of a control signal, each of said second and third generators producing a single output pulse at a fixed time subsequent to the occurrence of each input pulse respectively applied thereto, means coupled to one phase of said source for producing a pulse signal synchronous therewith, said pulse signal being applied to said first generator, the output pulse of said second and third generators being applied as said gating pulses to respective ones of said rectifiers, means for monitoring the value of said load current to produce said control signal having a value related to the value of said load current, and means for applying said control signal to said first generator.

6. In a self-regulating power supply having first, second and third gated rectifiers for the rectification of respective phases of a three phase primary power source to produce a rectified load current, each of said rectifiers conducting during each alternation period of said source for an interval determined by the occurrence of a respective one of gating pulses, means for producing said gating pulses comprising first, second, third and fourth pulse generators connected in cascade, each of said first, second and fourth generators producing a single output pulse at a fixed time subsequent to the occurrence of each input pulse respectively applied thereto, said second generator producing a single output pulse at a variable time subsequent to the occurrence of each input pulse in accordance with the value of a control signal, means coupled to one phase of said source for producing a pulse signal synchronous therewith, said pulse signal being applied to said first generator, the output pulse of said second, third and fourth generators being applied as said gating pulses to respective ones of said rectifiers, means for monitoring the value of said load current to produce said control signal having a value related to the value of said load current, and means for applying said control signal to said second generator.

7. In a self regulating power supply having first, second and third gated rectifiers for the rectification of respective phases of a three phase primary power source to produce a rectified load current, each of said rectifiers conducting during each alternation period of said source for an interval determined by the occurrence of a respective one of gating pulses, apparatus comprising means for producing said gating pulses including first, second and third gated relaxation oscillators connected in cascade, said first oscillator having a variable free-running frequency and producing a single output pulse at a variable time subsequent to the occurrence of each input pulse in accordance with the value of a control signal, each of said second and third oscillators having a constant free-running frequency and producing a single output pulse at a fixed time subsequent to the occurrence of each input pulse respectively applied thereto, means coupled to one phase of said source for producing a pulse signal synchronous therewith, said pulse signal being applied to said first oscillator, the output pulse of said first, second and third oscillators being applied as said gating pulses to respective ones of said rectifiers, means for monitoring the value of said load current to produce said control signal having a value related to the value of said load current, and means for applying said control signal to said first generator.

8. Apparatus as defined in claim 7 wherein each of said gated relaxation oscillators comprises a capacitor, means for charging said capacitor, a first transistor for discharging said capacitor, and a unijunction transistor for discharging said capacitor; said capacitor being discharged by said first transistor when rendered conductive by the input pulse applied thereto and being discharged by said unijunction transistor when the charge on said capacitor reaches a predetermined level.

References Cited in the file of this patent

UNITED STATES PATENTS

| 2,758,251 | Shrider et al. | Aug. 7, 1956 |
| 2,859,399 | Sommeia | Nov. 4, 1958 |